United States Patent
Khatwa et al.

(10) Patent No.: US 9,643,735 B2
(45) Date of Patent: May 9, 2017

(54) INTEGRATION OF BRAKING ACTION INFORMATION WITH FLIGHT DECK RUNWAY FUNCTIONS

(71) Applicant: HONEYWELL INTERNATIONAL INC., Morristown, NJ (US)

(72) Inventors: Ratan Khatwa, Sammamish, WA (US); Sivakumar Kanagarajan, TamilNadu (IN); Visvanathan Thanigai Nathan, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 14 days.

(21) Appl. No.: 14/722,931

(22) Filed: May 27, 2015

(65) Prior Publication Data

US 2016/0347473 A1   Dec. 1, 2016

(51) Int. Cl.
*B64D 45/00* (2006.01)
*B64D 45/04* (2006.01)
(Continued)

(52) U.S. Cl.
CPC ............ *B64D 45/04* (2013.01); *B60T 8/1703* (2013.01); *B64D 45/00* (2013.01); *G05D 1/0083* (2013.01);
(Continued)

(58) Field of Classification Search
CPC ........ B64D 45/00; B64D 45/04; B64D 45/06; G05D 1/0083; G08G 5/0013; G08G 5/0021; G08G 5/0091; G08G 5/025
See application file for complete search history.

(56) References Cited

U.S. PATENT DOCUMENTS

| 6,107,943 A | * | 8/2000 | Schroeder | G01C 23/00 |
| | | | | 340/945 |
| 6,657,630 B1 | * | 12/2003 | Kurosawa | A63F 13/10 |
| | | | | 345/475 |

(Continued)

FOREIGN PATENT DOCUMENTS

| CA | 2831509 A1 | 1/2014 |
| EP | 2800082 A2 | 11/2014 |

(Continued)

OTHER PUBLICATIONS

Allweatherinc; Integrated Display Systems [Retrieved from Internet Mar. 24, 2015].

(Continued)

*Primary Examiner* — Tuan C. To
(74) *Attorney, Agent, or Firm* — Lorenz & Kopf, LLP (57) ABSTRACT

Flight deck systems are provided for integrating braking action information with flight deck runway functions. In one embodiment, the flight deck system includes a cockpit display device on which an airport display, such as a two dimensional or three dimensional Airport Moving Map, is generated. A controller is coupled to the cockpit display device and configured to produce a braking action graphic on the airport display indicative of the current braking action of a first runway approached for usage by the aircraft. The controller may determine the current braking action of the runway from braking action information received over a datalink. Further, in certain embodiments, the controller can assign the current braking action of the runway to a predetermined braking action category and produce the braking action graphic to visually identify the assigned braking action category.

20 Claims, 5 Drawing Sheets

(51) Int. Cl.
*B60T 8/17* (2006.01)
*G05D 1/00* (2006.01)
*G08G 5/00* (2006.01)
*G08G 5/02* (2006.01)

(52) U.S. Cl.
CPC ......... *G08G 5/0013* (2013.01); *G08G 5/0021* (2013.01); *G08G 5/0091* (2013.01); *G08G 5/025* (2013.01)

(56) References Cited

U.S. PATENT DOCUMENTS

| | | | |
|---|---|---|---|
| 6,670,911 B2* | 12/2003 | Kishida | G01S 13/06 180/167 |
| 7,818,100 B2* | 10/2010 | Goodman | B64C 25/426 244/111 |
| 8,116,989 B2 | 2/2012 | Journade et al. | |
| 8,244,444 B2 | 8/2012 | Rado | |
| 8,436,750 B2 | 5/2013 | Fabre et al. | |
| 8,738,201 B2 | 5/2014 | Edwards et al. | |
| 9,058,742 B2* | 6/2015 | Conrardy | G08G 5/0047 |
| 9,230,444 B2 | 1/2016 | Lascombes et al. | |
| 9,296,488 B2 | 3/2016 | McKeown et al. | |
| 9,340,300 B2 | 5/2016 | Henderson | |
| 2008/0249675 A1* | 10/2008 | Goodman | B64C 25/426 701/16 |
| 2009/0018713 A1* | 1/2009 | Coulmeau | G08G 5/0013 701/3 |
| 2009/0125168 A1 | 5/2009 | Voisin | |
| 2011/0166723 A1 | 7/2011 | Valentova et al. | |
| 2012/0218127 A1 | 8/2012 | Kroen | |
| 2012/0221375 A1 | 8/2012 | Tillotson | |
| 2012/0262306 A1 | 10/2012 | Edwards et al. | |
| 2014/0195077 A1* | 7/2014 | Johnsen | B64D 45/04 701/16 |
| 2014/0278037 A1* | 9/2014 | Choksi | G08G 5/065 701/120 |
| 2015/0035662 A1* | 2/2015 | Bowers | B60Q 9/008 340/436 |
| 2015/0081142 A1* | 3/2015 | Henderson | B64D 45/04 701/16 |
| 2015/0302753 A1* | 10/2015 | Henderson | G08G 5/02 701/18 |
| 2016/0001748 A1* | 1/2016 | Moskowitz | B60K 1/04 701/22 |
| 2016/0267335 A1* | 9/2016 | Hampiholi | G06F 3/013 |

FOREIGN PATENT DOCUMENTS

WO 2011119634 A1 9/2011
WO 2013148421 A1 10/2013

OTHER PUBLICATIONS

SKYbrary; Overrun Prevention System; 2014.
Vinothkumar, J. et al.; Monitoring and Alerting System Integration in FMS Landing Phase using Image Fusion Techniques; International Journal of Emerging Technology and Advanced Engineering; vol. 2, Issue 11, Nov. 2012.
Extended EP Search Report for Application No. 16169190.2-1803 dated Oct. 27, 2016.

* cited by examiner

FIG. 1

| EXAMPLES OF BRAKING ACTION CATEGORIES | EXAMPLES APPENEDED TO INCLUDE REPORTING SOURCE | EXAMPLES APPENDED TO INCLUDE LOCATION-SPECIFIC CONDITIONS | EXAMPLES OF COLOR CODING FOR TEXT DISPLAY | EXAMPLES OF VISUALLY CODED SYMBOLOGY |
|---|---|---|---|---|
| GOOD | "BRAKING GOOD PER DC-10" | "BRAKING GOOD FIRST HALF OF RUNWAY" | INFORMATIONAL COLORS USED (E.G., WHITE TEXT ON GRAY BACKGROUND) | FIRST SYMBOL WITH INFORMATIONAL COLOR CODING (E.G., GREEN TRIANGLE) |
| FAIR | "BRAKING FAIR PER BOEING 737" | "BRAKING FAIR ACROSS RUNWAY" | INFORMATIONAL COLORS USED (E.G., WHITE TEXT ON GRAY BACKGROUND) | SAME OR DIFFERENT SYMBOL WITH INFORMATIONAL COLOR CODING (E.G., GREEN TRIANGLE) |
| POOR | "BRAKING POOR PER GROUND TESTING" | "BRAKING ACTION POOR AT RUNWAY END" | CAUTION COLORS USED (E.G., BLACK TEXT ON AMBER BACKGROUND) | SAME OR DIFFERENT SYMBOL WITH CAUTION COLOR CODING (E.G., AMBER TRIANGLE) |

INTEGRATION OF BRAKING ACTION INFORMATION WITH FLIGHT DECK RUNWAY FUNCTIONS

TECHNICAL FIELD

The following disclosure relates generally to aircraft and, more particularly, to flight deck systems integrating braking action information into one or more flight deck runway functions.

BACKGROUND

A significant fraction of aircraft accidents and incidents arise from runway overrun and veer-off events (collectively referred herein to as "runway excursions"). Runway excursions occur when the aircrew is unable to stop an aircraft within the available runway length due to, for example, the delay and inadequate application of the aircraft brakes. This may result from a lack of an adequate understanding on behalf of the aircrew as to the current braking conditions or "action" of the runway; that is, the efficiency with which the aircraft brakes can slow and ultimately stop the aircraft given the braking friction coefficient between the aircraft tires and the runway surface. The presence of liquid contaminants (e.g., liquid water, snow, slush, ice, oil, and the like) or solid contaminants (e.g., rubber deposits from aircraft tires) on the runway surface can greatly reduce the braking friction coefficient and thus adversely affect the aircraft braking performance. For example, the rollout distance required for a commercial aircraft to reach full stop on a wet runway surface can be more than twice the distance required by the aircraft to stop on the same runway when dry. It is thus important for the aircrew to gain prior knowledge of the current braking action of a runway prior to takeoff from or landing at the runway.

To help the aircrew of an aircraft monitor the latest information on runway conditions, braking action and airfield conditions may be reported to the aircraft via messages sent from Air Traffic Control (ATC), airline dispatch, or the crew of another aircraft. Messages can be provided as voice broadcasts, digital Notices to Airmen (NOTAMS), or Automated Terminal Information Service (ATIS) messages. Additionally, the aircrew of aircraft that has recently landed at a particular runway may report the current braking action of the runway when providing the Pilot Information Report (PIREP), especially if the braking conditions of the runway have significantly deteriorated. The ATC may then communicate the reported braking action to any approaching aircraft approached to land at the runway by, for example, a voice broadcast. This practice can help improve safety by providing the aircrew of an aircraft with advanced notice of deteriorated braking conditions on a runway approached for future use by the aircraft. However, further improvements in the manner in which aircrews are notified of current runway braking conditions, and the impact of dynamically-changing braking conditions on other flight deck functions, are still needed.

BRIEF SUMMARY

Flight deck systems for integrating braking action information with flight deck runway functions are provided. In one embodiment, the flight deck system includes a cockpit display device on which an airport display, such as a two dimensional or three dimensional Airport Moving Map, is generated. A controller is coupled to the cockpit display device and configured to produce a braking action graphic on the airport display indicative of the current braking action of a first runway approached for usage by the aircraft. The controller may determine the current braking action of the runway from braking action information received over a datalink. Further, in certain embodiments, the controller can assign the current braking action of the runway to a predetermined braking action category and produce the braking action graphic to visually identify the assigned braking action category.

In a further embodiment, the flight deck system includes a datalink receiving braking action information describing the current braking action of a runway approached for usage by the aircraft. The flight deck system can further include a Runway Awareness and Alert System (RAAS) coupled to the datalink, in which case the RAAS may determine whether to generate a short runway alert for the runway based, at least in part, on the runway length and the current braking action of the runway. Additionally or alternatively, the flight deck system may further include a Flight Management System (FMS) coupled to the datalink, in which case the FMS may utilize the current braking action of the runway in the performance of take-off and landing calculations for the runway.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. As appearing herein, the term "pilot" encompasses all members of an aircrew.

The following describes embodiments of a flight deck system, which receives braking action information describing the current or recently-assessed braking conditions of runways. The braking action information can be manually entered into the flight deck system, but is preferably received over a datalink and updated periodically at a relatively rapid refresh rate (e.g., on the order of a fraction of a second). In this manner, the braking action information may be updated in real-time or near real-time to reflect changes in the braking action across the runway surface with, for example, changing weather conditions. In many embodiments, the flight deck system will visually convey the braking action information as a braking action graphic generated on an airport display; that is, a graphical display depicting an airport surface or a display including graphical elements superimposed over a real-world view of an airport surface, as seen through the display. The braking action graphic can be selectively generated on the airport display depending upon different factors, such as the receipt of pilot selection data and the severity of the braking action degradation on the runway surface. Additionally or alternatively, embodiments of the flight deck system can incorporate the braking action information into calculations performed by other systems onboard the aircraft, which may or may not be included in the flight deck display system. For example, the braking action information can be utilized in Take-Off and Landing Distance (TOLD) computations of by a Flight Management System (FMS) and/or utilized in the "Short Runway" alerting functions of a Runway Awareness and Advisory System (RAAS) system. By way of non-limiting illustration, a detailed discussion of the manners in which such (e.g., real-time datalinked) braking action information can be integrated into one or more flight deck functions will now be provided in conjunction with FIGS. 1-5.

Generic Example of a Flight Deck System

Figure 1:
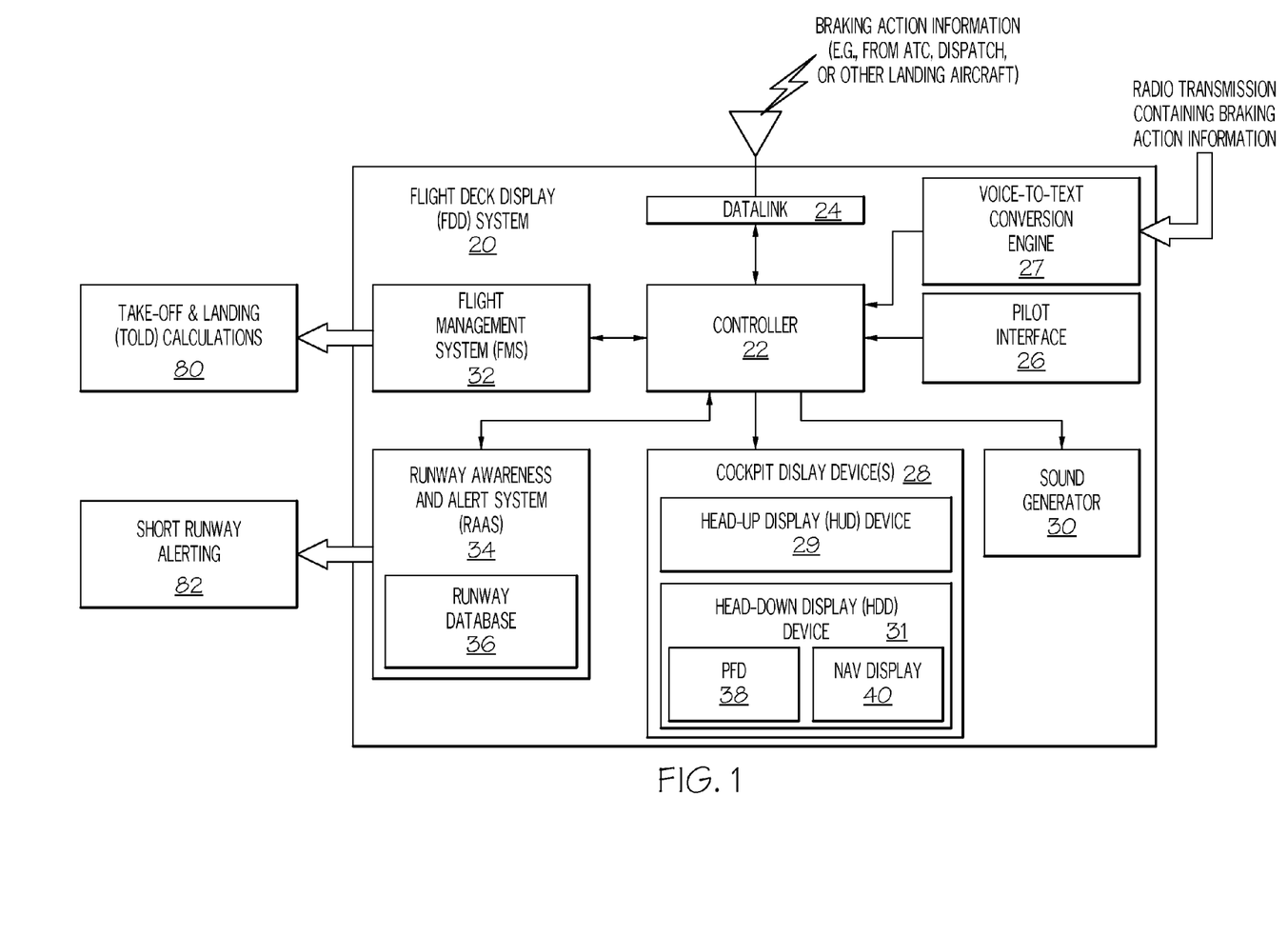
FIG. 1 is a block diagram of a flight deck system suitable for generating braking action graphics denoting the current braking conditions of one or more runways and for performing other functions in response to the receipt of braking action information, as illustrated in accordance with an exemplary embodiment of the present invention.

FIG. 1 is a block diagram of flight deck system 20 deployed onboard an aircraft and illustrated in accordance with an exemplary embodiment of the present invention. In this particular example, flight deck system 20 includes the following components, each of which may be comprised of multiple devices, systems, or elements: (i) a controller 22; (ii) a datalink 24 coupled to an input of controller 22, (iii) a pilot interface 26 coupled to an input of controller 22, (iv) a number of cockpit display devices 28 coupled to one or more outputs of controller 22, and (v) a sound generator 30 coupled to an output of controller 22. As described in more detail below, controller 22 obtains and processes current data indicative of the current braking action across one or more runways. Controller 22 can be implemented utilizing any suitable number of individual microprocessors, navigational equipment, memories, power supplies, storage devices, interface cards, and other standard components known in the art. Furthermore, the controller 22 may include or cooperate with any number of software programs (e.g., flight deck programs) or instructions designed to carry out the various methods, process tasks, calculations, and display functions described herein.

In certain embodiments, the braking action information may be manually entered into controller 22 by a pilot utilizing pilot interface 26. In this regard, pilot interface 26 can be any device or group of devices enabling a pilot to input data into flight deck system 20, such as various combinations of switches, dials, buttons, keyboards, and cursor devices. The pilot may obtain the runway braking action information from, for example, a voice broadcast or a digital message, such as a Pilot Information Report (PIREP). It is preferred, however, the braking information data is received wirelessly from a remote source via datalink 24 in real-time. Datalink 24 can assume any form suitable for receiving wireless signals containing braking action information from one or more remotely-located data sources. Sources from which datalink 24 may receive braking action information include, but are not limited to, Air Traffic Control (ATC), airline dispatch, and other aircraft reporting runway braking action after using a particular runway for takeoff or landing. The braking action information may be provided in the form of, for example, a PIREP, a digital Notice to Airmen (NOTAM), and/or an Automated Terminal Information Service (ATIS) transmission. As still further indicated in FIG. 1, braking action information can be derived by receiving a voice broadcast (e.g., a PIREP received as a radio transmission), processing the verbally-conveyed braking action information to text (e.g., utilizing a voice-to-text conversion engine 27), and then supplying the braking action information to controller 22 for further processing.

Cockpit display devices 28 can be any image-generating devices that operate in the cockpit of an aircraft to produce an airport display thereon; the term "airport display" defined herein to encompass displays on which images representative of an airport surface are generated, as well as displays superimposed over a real-world view of an airport surface as seen from the cockpit of the aircraft. As shown in FIG. 1, cockpit display devices 28 can include a Head-Up Display (HUD) device 29 and/or Head-Down Display (HDD) devices 31. HUD device 29 can be, for example, a transparent or partially-transparent screen affixed to the aircraft cockpit on which graphics (e.g., the below-described braking action graphic) may be generated to effectively superimpose the graphics over the real-world view of airport surfaces. Other examples of HUD devices include pilot-worn display devices, such as helmet-mounted and near-to-eye display devices. By comparison, HDD devices 31 can include display devices that are affixed to or installed within to the aircraft cockpit, as well as portable electronic devices carried into the aircraft cockpit by a pilot (e.g., tablet computers, laptops, and Electronic Flight Bags) on which an airport display is produced while the electronic device is located in the cockpit. When produced on one or more of HDD devices 31, the airport display will often assume the form of a two dimensional (2D) Airport Moving Map (AMM) generated on a navigational (NAV) display or a three dimensional (3D) AMM generated on a Primary Flight Display (PFD). Examples of such displays are discussed below in conjunction with FIGS. 2-5.

With continued reference to the exemplary embodiment shown in FIG. 1, flight deck system 20 further includes an FMS 32 and an RAAS 34. FMS 32 and RAAS 34 are each coupled to controller 22 for bi-directional communication therewith. While controller 22, FMS 32, and RAAS 34 are illustrated as distinct blocks in FIG. 1, it will be appreciated that controller 22 can be integrated into or may be part of FMS 32, RAAS 34, or another aircraft system in actual implementations of flight deck system 20. Furthermore, the individual elements and components of flight deck system 20 can be implemented in a distributed manner using any number of physically-distinct and operatively-interconnected pieces of hardware or equipment. The lines connecting the components of flight deck system 20 denote operative connections, which can be implemented as hardwire or wireless connections utilizing known aircraft infrastructure connections. In practice, flight deck system 20 and the aircraft on which system 20 is deployed will include various other devices and components for providing additional functions and features, which are not shown in FIG. 1 and will not be described herein to avoid unnecessarily obscuring the invention.

During operation of flight deck system 20, controller 22 obtains and processes data indicative of the current braking action across runways and possibly other airport surfaces. This data may be manually entered into controller 22 by a pilot utilizing interface 26. It is preferred, however, that the braking action information is received wirelessly via datalink 24 from one or more remote sources. Controller 22 may then utilize the braking information data to perform certain display functions, supply the data to FMS 32 for usage in carrying-out TOLD calculations, and/or supply the data to RAAS 34 for usage in determining whether a "Short Runway" alert should be generated. Such systems (flight management systems and runway awareness and alert systems) are well-known in the avionics industry. Generally, FMS 32 can assume any form suitable for performing TOLD calculations, while RAAS 34 can assume any form suitable for selectively producing "Short Runway" alerts prior to aircraft takeoff and/or aircraft landing in the below-described manner. Furthermore, as generically indicated in FIG. 1, RAAS 34 can include a runway database 36, which contains runway lengths and possibly other information pertaining to a database of runways. In a preferred embodiment, RAAS 34 is a SMARTRUNWAY® and/or a SMARTLANDING® system developed and commercially marked by the assignee of the present application, Honeywell International Inc., currently headquartered in Morristown, N.J.

In practice, the current braking action of a runway will typically be assessed in one of two ways. First, the braking action of an airport's runway may be periodically assessed through manual inspection or by testing utilizing a specialized friction test machine. This information may then be provided to an aircraft carrying flight deck system 20 (FIG. 1) as a digital ATIS transmission (which may also include other information, such as weather conditions) or a digital NOTAM. Additionally or alternatively, the braking action information may be included in an ATC transmission provided along with clearance to use (land at or takeoff from) a particular runway. Second, the braking action of a runway may be reported by the aircrew of an aircraft that has recently utilized the runway. This will typically occur when a pilot provides a PIREP after landing, which may contain information on the current braking action (often only when braking action is degraded or compromised to a certain extent) along with other information pertaining to the runway, such as wind conditions. The braking action information, as extracted from the PIREP, will then typically be conveyed to the aircraft carrying flight deck system 20 (FIG. 1) by an intermediary, such as the airport authority or ATC. This notwithstanding, this information may be directly communicated to the aircraft carrying flight deck system 20 (FIG. 1) from the landing aircraft as, for example, an Automatic Dependent Surveillance Broadcast (ADS-B) communication in certain embodiments. The current braking action of a runway can also be inferred from or adjusted based upon current weather conditions, such as whether rain, sleet, or snow is reported or detected at the runway surface.

As generically indicated in FIG. 1, a Primary Flight Display (PFD) 38 and/or a NAV display 40 can be generated on HDD devices 31. PFD 38 can be generated in a three dimensional (3D) format, typically from a perspective viewpoint, and may depict a 3D AMM when the aircraft is located on, above, or in close vicinity to an airport surface. The 3D AMM may thus be considered part of the PFD when the aircraft is located at an airport and the PFD displays the runways and other surfaces (e.g., taxiways) of the airport. In contrast, a NAV display 40 is generated in a two dimensional (2D) or plan format, typically from a top-down viewpoint; and depicts a 2D AMM when the Field-of-View (FOV) of NAV display 40 encompasses an airport surface due to the location of the aircraft or pilot selection of the FOV of the display. Thus, in such embodiments, the 2D AMM may be generated as part of a NAV display when depicting an airport layout including runways, intersecting taxiways, and other runway surface features. In one embodiment, NAV display 40 is an interactive navigation display (commonly referred to as an "iNAV" display), which enables a pilot to select items (e.g., a runway or waypoint) depicted on the iNAV display to summon an informational window describing certain aspects of the selected item.

During operation, flight deck system 20 receives braking action information pertaining to a runway approached for use by the aircraft carrying system 20; the phrase "approached for use," as appearing in this document, referring to a runway approached by the aircraft for purposes of takeoff, landing, or traversal. As noted above, the braking action information can be manually entered into controller 22 by a pilot utilizing a pilot interface 26, but is preferably received in real-time over datalink 24 and automatically relayed to controller 22. While certain examples have been provided above for purposes of explanation, it will be appreciated that the particular manner in which flight deck system 20 receives the braking action information and the source from which the braking action information originates will be largely inconsequential in many embodiments of the present invention. When receiving the braking action information, flight deck system 20 can utilize this information in a number of manners. In certain embodiments, flight deck system 20 can forward this information to (i) FMS 32 for usage in performing TOLD calculations and/or to (ii) RAAS 34 for usage in determining when to generate "Short Runway" alerts. Additionally or alternatively, flight deck system 20 can selectively display the braking action information on a 3D AMM produced on a PFD and/or on 2D AMM produced on a NAV display. Examples of the manners in which flight deck system 20 can display the braking action information on a 2D AMM and a 3D AMM will now be described in conjunction with FIGS. 2-5.

Display of Real-Time Braking Action on a 2D or 3D AMM

Flight deck system 20 and, specifically, controller 22 can utilize the real-time braking information obtained via datalink 24 (or entered via pilot interface 26) to determine the current braking action of a runway approached for future use by the aircraft carrying system 20. In preferred implementations, the current braking action is then visually conveyed as a braking action graphic generated on PFD 38 or NAV display 40. The braking action graphic is preferably "selectively" displayed; that is, displayed only at selected times or in response to pilot selection data received via pilot interface 26. When displayed, the braking action graphic can be presented in any manner that can be intuitively and rapidly comprehended by a pilot when glancing at the display. For example, the braking action graphic can be displayed as text, as symbology, or a combination thereof. To quickly relate the braking action status to the pilot, it is preferred that the braking action graphic is categorized; that is, assigned to one of a number of categories or classifications representing different classes of braking effectiveness. An example of the manner in which the braking action graphic can be categorized is described below in conjunction with FIG. 2.

Figure 2:
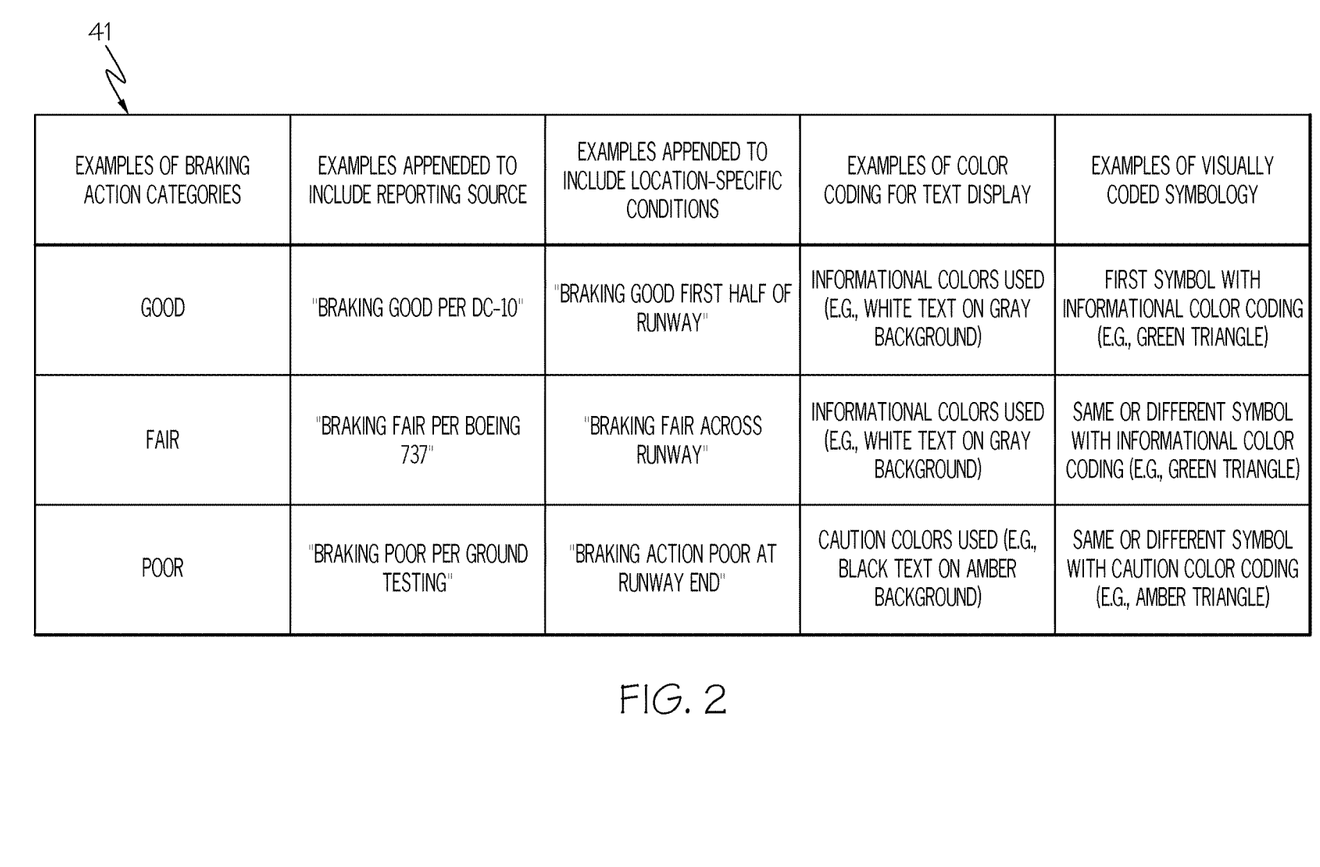
FIG. 2 is a table setting-forth several examples of different manners in which the real-time braking action information can be displayed on one or more airport displays.
Figure 3:
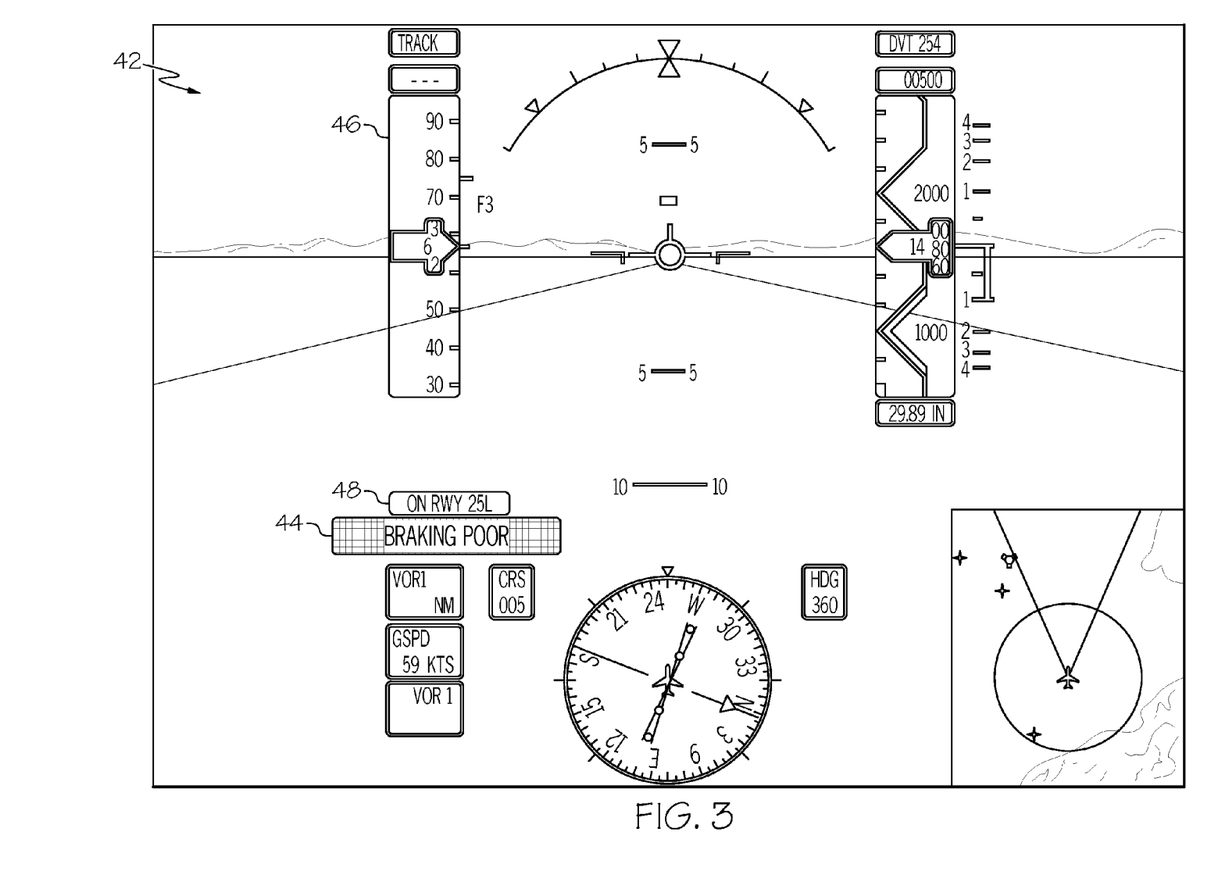
FIG. 3 is a screenshot of a three dimensional Aircraft Moving Map (AMM), which can be generated on a Primary Flight Display (PFD) and which includes a braking action graphic (e.g., a text annunciation) visually conveying the current braking condition of a runway.

By way of non-limiting example, FIG. 2 presents a table 41 containing a number of categories or classifications to which the current braking action can be assigned (see, in particular, the first column of table 41). For simplicity and rapid comprehension, three braking effectiveness categories are used: "GOOD," "FAIR," and "POOR." In this example, the "GOOD" braking action category denotes little to no degradation of aircraft braking effectiveness and directional control on runway. The "FAIR" braking action category denotes moderate degradation of aircraft braking effectiveness and directional control. Finally, the "POOR" braking action category denotes significant degradation of aircraft braking effectiveness and directional control. If desired, and if supported by the reported braking action information, combinations of the aforelisted categories can be utilized to provide further refinement in describing the current braking action of a runway, such as "GOOD to FAIR," "FAIR to POOR," and the like. In further embodiments, different types and numbers of categories can be utilized to classify or rank the current runway braking action, as desired.

In certain embodiments, the braking action graphic can also convey information beyond the current braking condition of a particular runway. For example, as indicated in the second column of table 41 (FIG. 2), the braking action graphic (in this case, a text-based graphic or "text annunciation") can identify the source from which the relevant braking action information has been derived. This may be particularly useful when the braking action information originates from another aircraft that has recently landed at or taken-off from a runway designated for future usage by the aircraft carrying system 20. In this case, the text annunciation graphic can further identify the type of aircraft from which the runway braking action information originates. As a more specific example, if originating from a PIREP issued by the pilot of DC-10 reporting fair or moderate braking action after landing, the following text annunciation graphic may be produced on PFD 38 and/or NAV display 40, as appropriate: "FAIR PER DC-10." Additionally or alternatively, as indicated in the third column of table 41 (FIG. 2), the text annunciation graphic may indicate variability of the braking action along the length of the runway when this data is available. An example of such a text annunciation graphic is: "BRAKING POOR FIRST HALF OF RUNWAY." As a still further possibility, the text annunciation graphic may state "NO BRAKING ACTION REPORTS FOR RWY" when data is pertaining to the braking action of a runway is unavailable or inadequate.

The above-described text annunciation graphics pertaining to braking action can be selectively displayed on one or more of the graphical displays generated on cockpit display devices 28, including HUD device 29 and/or HUD devices 31. Consider, for example, display of the braking action graphic on the 3D AMM produced on PFD 38, which may be generated on one of HDD devices 31. PFD 38 is considered a tactical display, which is generally reserved for vital flight information. Thus, in instances wherein little to no degradation of braking action or only moderate degradation of braking action has been reported (e.g., the braking action is "GOOD" or "FAIR"), the braking action graphic (e.g., text annunciation graphic) may not be displayed on a 3D AMM produced on of PFD 38. Alternatively, the braking action text may be temporarily displayed on the 3D AMM of PFD 38 for a brief period of time (e.g., a few seconds) or may be displayed on PFD 38 until dismissed by the pilot utilizing interface 26. Conversely, in instances wherein significant braking action degradation is reported, a corresponding braking action text annunciation graphic is preferably displayed on the 3D AMM of PFD 38 to provide a visual alert or warning of the compromised braking condition. This may be appreciated more fully by referring to FIG. 3, which is a screenshot of an exemplary PFD depicting a 3D AMM 42 including a braking action text annunciation graphic 44. In this exemplary scenario, braking action text annunciation graphic 44 indicates that the braking action for the designated runway is significantly compromised or "POOR." Text annunciation graphic 44 can be generated in a central portion of the PFD in a region beneath airspeed tape 46 and adjacent runway identification readout 48. In further embodiments, braking action text annunciation graphic 44 can appear at another location on the PDF.

The appearance of braking action text annunciation graphic 44 will vary amongst embodiments. In the exemplary embodiment shown in FIG. 3, text annunciation graphic 44 is produced as text overlaid onto a shaded background or filled text box. If desired, the appearance of the text and/or the appearance of the shaded box can be altered as appropriate to convey increasing urgency with increasing degradation of the braking action. As indicated in the fourth column of table 41 (FIG. 2), color coding is conveniently utilized for this purpose. In this case, the text annunciations for "GOOD" and "FAIR" braking actions can be generated in pre-established informational colors, such as white text superimposed over a gray background. By comparison, the text annunciation for "POOR" braking action may produced in pre-established caution colors, such as black text over a yellow or amber shading (represented in FIG. 3 by a first type of cross-hatching). This generally accords with widely established color coding schemes wherein white, amber, and red are utilized as informational, caution, and warning colors, respectively. Other colors coding schemes can be employed in further embodiments, and the color coding assigned to each braking action information category can vary; e.g., in certain embodiments, the text or background for "POOR" braking action can be color coded in a warning color, such as red. In further embodiments, the appearance of braking action text annunciation graphic 44 can varied in other manners to draw attention to the braking action information. For example, the font size of text annunciation graphic 44 can be increased when the braking action is poor and/or an animation, such as flashing, can be applied to graphic 44.

Figure 4:
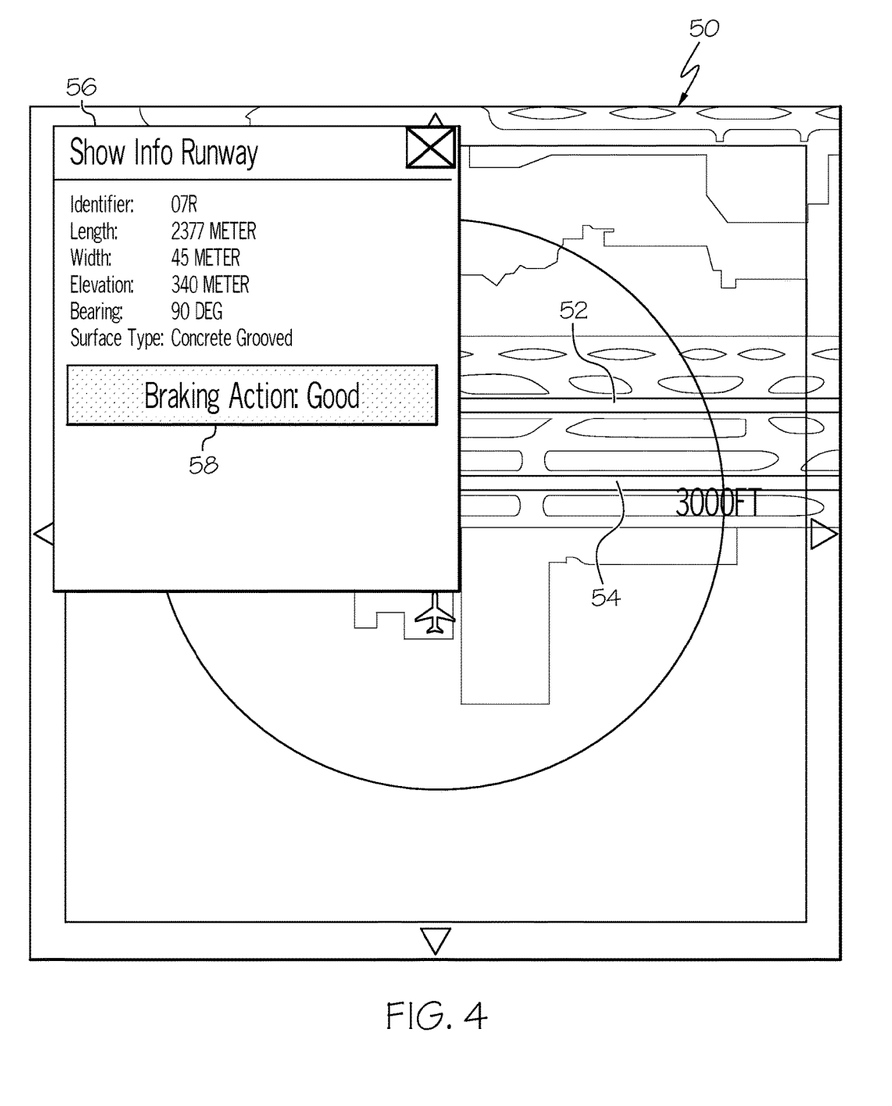
FIG. 4 is a screenshot of an exemplary two dimensional (2D) AMM, which is generated as part of a navigational display and which includes a braking action graphic (e.g., text included in a pop-up dialogue window) visually conveying the current braking condition of a runway.

In addition to or as an alternative to the display of braking action information on a 3D AMM, the braking action graphic can also be displayed in textual form on a 2D AMM generated on NAV display 40 (FIG. 1). Consider, for example, the NAV display shown in FIG. 4 and depicting a 2D AMM 50, as seen from a top-down or plan view. In this example, 2D AMM 50 is produced as a part of an iNAV display, which enables selection of graphical elements (e.g., runways and waypoints) displayed on AMM 50 to summon informational windows containing information describing the selected elements. As can be seen in FIG. 4, 2D AMM 50 includes an airport surface layout including two runways 52 and 54. A pilot has selected one of these runways utilizing interface 26 (FIG. 1) to bring-up a dialogue box or informational window 56. In addition to other information, window 56 includes a text annunciation graphic 58 visually denoting the current braking status of the selected runway. Little to no deterioration of the braking action has been reported for the selected runway, as indicated by the text annunciation "BRAKING ACTION: GOOD." In this manner, the braking action graphic is only displayed on 2D AMM 50 of NAV display 40 (FIG. 1) when requested by pilot selection data received via interface 26. A format similar to that described above in conjunction with FIGS. 2 and 3 can be utilized to display text annunciation graphic 58 shown in FIG. 4. Thus, the text may be color coded in a first informational color (e.g., white), while the background or shaded box on which the text is overlaid of the text may likewise be color coded in a different informational color (e.g., black, as represented in FIG. 4 by a second type of cross-hatching). If the current braking action was instead poor, the color coding of text annunciation graphic 58 would vary accordingly; e.g., as before, the font could be color coded black, while the shaded background region could be color coded to a caution or warning color (e.g., amber or red, respectively).

Figure 5:
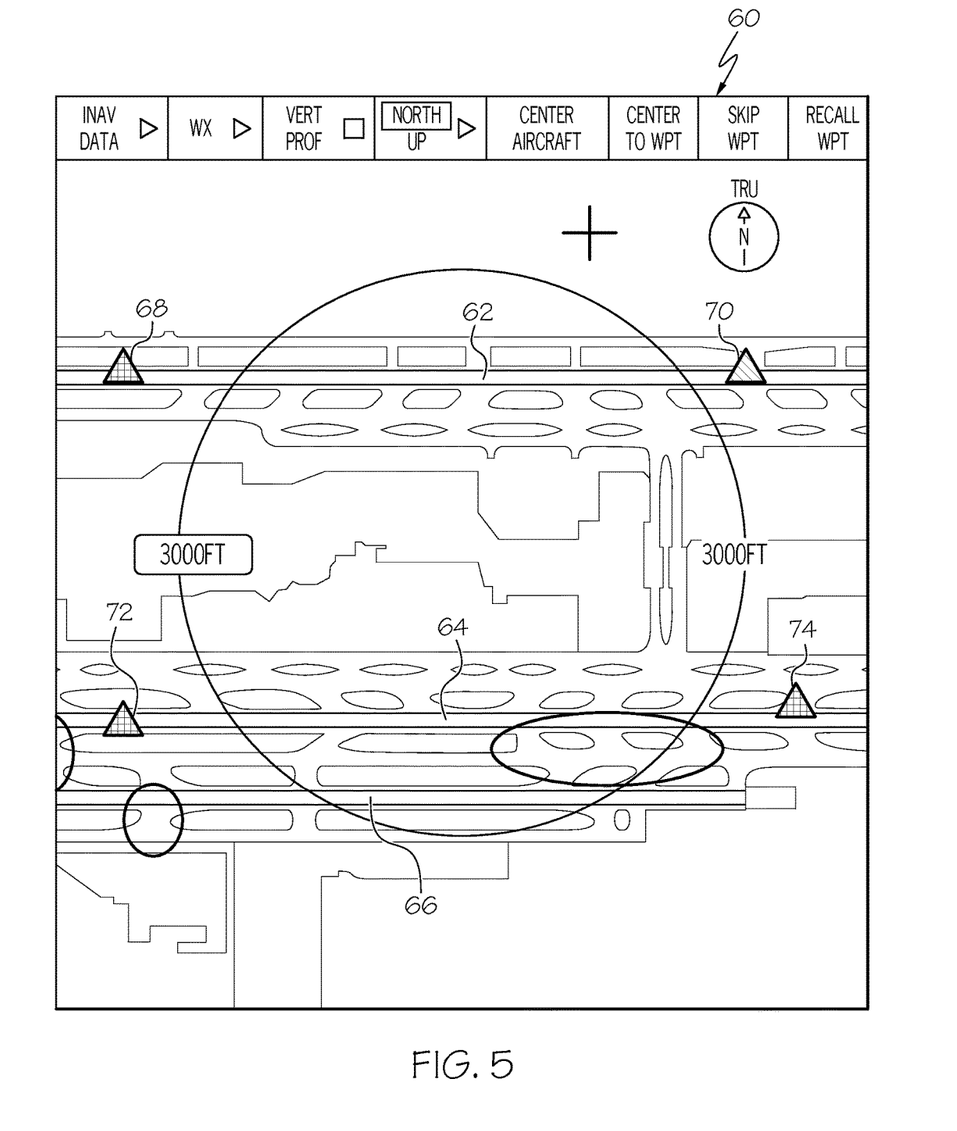
FIG. 5 is a further screenshot of an exemplary navigational display depicting a 2D AMM, which visually conveys the current braking condition of multiple runways (e.g., via symbology superimposed on a plan view of the airport surface).

In addition to or as an alternative to producing text-based annunciations, flight deck system 20 (FIG. 1) can also visually denote the current braking action for runways utilizing non-textual graphics or symbology. Consider, for example, the NAV display shown in FIG. 5 and depicting a 2D AMM 60, as seen from a top-down or plan view. 2D AMM 60 shown in FIG. 5 is similar to 2D AMM 50 shown in FIG. 4. As was previously the case, 2D AMM 60 depicts a region of an airport surface encompassing a number of runways 62, 64, and 66, with the current braking action displayed for runways 62 and 64. However, in this case, the braking action of both runways is expressed utilizing coded symbology (also considered "braking action graphics" in context of this document). Specifically, symbols 68 and 70 visually denote the braking action at two different locations on runway 62, while symbols 72 and 74 visually denote the braking action at two different location on runway 64. The symbology will vary amongst embodiments, but is preferably visually coded in a manner that intuitively indicates the braking action category at each runway location. Such visual coding can include changes in symbol shape, size, and/or color. As a non-limiting example, and as indicated in the fifth column of table 41 (FIG. 2), a triangular icon can be utilized for all categories of braking action, while the color coding of the icon can be varied to visually convey the braking action of a runway at a location adjacent to or near each icon. In the illustrated example, triangular icons 68, 72, and 74 are each color coded yellow (represented by first cross-hatching in FIG. 5) to indicate that the braking action at these locations has been assessed as poor; while icon 70 is color coded green (represented by a second cross-hatching in FIG. 5) to indicate that the braking action at this location has been assessed as fair or good. A pilot thus need only glance at 2D AMM 60 to quickly ascertain the current braking conditions at multiple runways and any changes in the braking condition along the length of the runways. Similar or identical symbology can also be produced for other airport surfaces, such as taxiways, parking stands, gate areas, and the like, should surface information be available for those areas.

In addition to producing braking action graphics on an airport display in the above-described manner, flight deck system 20 (FIG. 1) can also generate aural alerts or audible annunciations to further advise the flight crew of the current braking conditions of runways or other airport surfaces. In this regard, controller 22 can command sound generator 30 to produce a verbal message describing the braking condition of a runway in conjunction with generation of a braking action graphic of the type described above. Alternatively, controller 22 may command sound generator 30 to generate a verbal message or aural alert describing the runway braking condition only under selected conditions, such as when braking condition of the runway has been reported as significantly deteriorated or "POOR." In this latter case, controller 22 may command sound generator 30 to generate an audible alert or cautionary message prior to usage of the runway surface by the aircraft, such as "CAUTION: POOR BRAKING CONDITIONS ON RUNWAY."

Integration of Braking Action Information into Calculations Performed by the Flight Deck System Embodiments of flight deck system 20 can utilize the (e.g., real-time datalinked) braking action information in the performance of certain calculations. For example, the braking effectiveness data can be integrated into TOLD calculations performed by a FMS. To further help emphasize this point, FIG. 1 generically indicates the performance of TOLD calculations by FMS 32 at block 80. TOLD calculations may also utilize inputs from other onboard aircraft systems, as well as a minimal set of pilot inputs. Utilizing such inputs, FMS 32 can compute various takeoff or landing requirements, such as V-speeds, field length requirements, obstacle clearance, and engine/aircraft limits. Conventionally, FMS 32 take-off and landing initialization may require pilot entry of runway conditions, such as DRY or WET. By automatically providing the datalinked braking action information regarding runway condition/braking action to FMS 32, the need for such manual pilot entry can be avoided in at least some implementations of system 20. Furthermore, runway data entry in FMS 32 can be expanded in a manner consistent with the format of braking action reports, such that entries of more than DRY and WET conditions are permissible. As the braking action information will often be more descriptive than simple manual entries of DRY or WET conditions, and as the braking action information can be updated in real-time, the TOLD computations can be performed more accurately by FMS 32 when considering the braking action information received via datalink 24 (FIG. 1).

In addition to or as an alternative to the performance of FMS calculations, the braking effectiveness data can be integrated into "Short Runway" alerting functions provide by runway navigation systems, such as RAAS, SMART-RUNWAY®, and SMARTLANDING® systems. FIG. 1 generically indicates selective generation of short runway alerts by RAAS 34 at block 82. With respect to the "short runway" alerts, such alerts are conventionally generated utilizing a "nominal" fixed runway length for a given aircraft irrespective of runway conditions. For example, a nominal length of 5000 feet (1524 meters) may be selected for a given aircraft as the triggering condition for the alert. If the aircraft is on approach to a runway shorter than this nominal length, a short runway alert is provided. Similarly, a nominal fixed runway length is used for triggering the alert for a take-off on a runway that is potentially too short to ensure a safe take-off therefrom. By integrating the (e.g., real-time datalinked) braking action/runway condition data into this calculation and alert function, a variable minimal runway length can be determined as a function of the reported runway condition and utilized in determining whether to trigger such Short Runway alerts. For example, an adjustable runway length of 5000 feet (1524 meters) can be utilized as a threshold for generating a short runway alert when the braking conditions are reported as good across the runway surface, whereas an adjustable runway length of 6000 feet (1829 meters) can be utilized as threshold for the alert generating threshold when medium braking (e.g., wet) conditions are reported for the runway. This example notwithstanding, the actual magnitudes adopted is preferably based on actual aircraft performance data for various runway conditions. Such an approach is applicable to both the airborne and ground Short Runway alerts.

CONCLUSION

There has thus been provided flight deck systems that increase pilot situational awareness of existing runway conditions and possible deterioration in braking action during the critical phase of take-off and landing. The manner in which the braking action information is displayed can be tailored to reflect severity, aircraft type, message content, and exact location of annunciations may vary from the examples described herein. In this manner, braking action and runway condition information (e.g., provided by PIREPS, NOTAM, ATIS, or another source) can be integrated into other flight deck system functions for both tactical (e.g., during landing) and strategic (e.g., pre-flight) purposes. This can include display of runway braking action on 2D and 3D AMM displays, computing "Short Runway" alerts as a function of real-time runway conditions, and/or performing FMS TOLD computations automatically on the basis of accurate runway condition. The braking condition information can further be extended to areas other than runways, such as taxiways, ramps, and the like.

The foregoing has thus provided embodiments of a flight deck system, which receives braking action information for a runway approached or scheduled for future use by an aircraft. The braking action information can be received over a datalink and updated periodically in near real-time to reflects changing conditions across the runway surface. The flight deck system can visually convey the braking action information as a braking action graphic generated on a 2D AMM of a NAV display and/or 3D AMM of a PFD. Additionally or alternatively, embodiments of the flight deck system can incorporate the real-time braking action information into the calculations performed by other systems onboard the aircraft, such as FMS TOLD computations or RAAS "short runway" alerting functions. While the foregoing exemplary embodiment was described above in the context of a fully functioning computer system (i.e., flight deck system 20 shown in FIG. 1), those skilled in the art will recognize that the mechanisms of the present invention are capable of being distributed as a program product (i.e., a flight deck display program) and, furthermore, that the teachings of the present invention apply to the program product regardless of the particular type of non-transitory, computer-readable media (e.g., floppy disc, hard drive, memory card, optical disc, etc.) employed to carry-out its distribution.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A flight deck system for deployment onboard an aircraft, the flight deck system comprising:
 a cockpit display device on which an airport display is generated: and
 a controller coupled to the cockpit display device, the controller configured to:
  produce a braking action graphic on the airport display indicative of the current braking action of a first runway approached for usage by the aircraft: and
  categorize the current braking action of the first runway and to visually code the braking action graphic in accordance with the categorization of the current braking action.

2. The flight deck system of claim 1 further comprising a datalink over which braking action information is received, the controller coupled to the datalink and configured to determine the current braking action of the first runway from the braking action information received over the datalink.

3. The flight deck system of claim 1 wherein the braking action graphic comprises a text annunciation graphic, which is color coded in accordance with the categorization of the current braking action.

4. The flight deck system of claim 3 further comprising a pilot interface coupled to the controller, the controller configured to selectively generate the text annunciation graphic on the airport display in response to pilot selection data received via the pilot interface.

5. The flight deck system of claim 4 wherein the airport display comprises a two dimensional Airport Moving Map (AMM) produced on a navigation display, and wherein the controller is configured to generate an information window on the two dimensional AMM containing the text annunciation graphic when the first runway is selected by a pilot utilizing the pilot interface.

6. The flight deck system of claim 1 wherein the airport display comprises a three dimensional Airport Moving Map (AMM) produced on a primary flight display, and wherein the controller is configured to selectively generate the braking action graphic on the three dimensional display as a function of with the categorization of the current braking action.

7. The flight deck system of claim 1 wherein the airport display comprises a two dimensional Airport Moving Map (AMM) including a runway graphic representing the first runway, and wherein the controller is configured to generate the braking action graphic as a symbol adjacent the runway graphic.

8. The flight deck system of claim 7 wherein the controller is further configured to generate a second symbol at adjacent the runway graphic and offset from the first symbol to visually indicate any variance in the current braking action along the length of the runway.

9. The flight deck system of claim 1 wherein the braking action graphic comprises a text annunciation graphic, which indicates a reporting source from which the aircraft braking data originates.

10. The flight deck system of claim 1 wherein the braking action graphic comprises a text annunciation graphic, which indicates any variance in the current braking action along the length of the runway.

11. The flight deck system of claim 1 further comprising a Flight Management System (FMS) coupled to the controller, the controller providing the current braking action of the runway to the FMS for usage in the performance of take-off and landing calculations for the runway.

12. The flight deck system of claim 1 further comprising a Runway Awareness and Alert System (RAAS) coupled to the controller, the controller providing the current braking action of the runway to the RAAS, the RAAS determining whether to generate a short runway alert for the runway based, at least in part, on the length of the runway and the current braking action of the runway.

13. The flight deck system of claim 1 further comprising a sound generator coupled to the controller, the controller commanding the sound generator to generate a verbal annunciation describing the current braking of the first runway.

14. A flight deck system for deployment onboard an aircraft, the flight deck system comprising:
- a datalink over which braking action information is received, the braking action information indicative of the current braking action of a first runway approached for usage by the aircraft; and
- a Runway Awareness and Alert System (RAAS) coupled to the datalink, the RAAS configured: (i) to utilize a variable minimum runway length in determining when to generate a short runway alert for the first runway approached for usage by the aircraft; and (ii) to adjust the variable minimum runway length as a function of the current braking action indicated by the braking action information received over the datalink such that the variable minimum runway length increases in value with increasing degradation of the current braking action.

15. The flight deck system of claim 14 further comprising a controller coupled to the RAAS, the controller configured to categorize the current braking action of the first runway and to convey the categorization of the current braking action to the RAAS for usage in adjusting the variable minimum runway length.

16. The flight deck system of claim 15 wherein the RAAS is configured to assign one of a number of different threshold values to the variable minimum runway length in accordance with the categorization of the current braking action.

17. The flight deck system of claim 16 further comprising a voice-to-text conversion engine coupled to the controller, and wherein the controller is configured to extract the braking action information from a Pilot Information Report received over the datalink or received as a radio transmission converted to text by the voice-to-text conversion engine.

18. A flight deck system for deployment onboard an aircraft, the flight deck system comprising:
- a datalink over which braking action information is received, the braking action indicative of the current braking action of a first runway approached for usage by the aircraft;
- a Flight Management System (FMS) coupled to the datalink and configured to perform Take-Off and Landing Distance (TOLD) calculations; and
- a controller coupled to the datalink and to the FMS, the controller configured to repeatedly receive updated braking action information via the datalink and to automatically provide the braking action information to the FMS for usage in updating the TOLD calculations for the first runway.

19. The flight deck system of claim 18 further comprising a cockpit display device on which an airport display is generated, the controller coupled to the cockpit display device and configured to produce a braking action graphic on the airport display indicative of the current braking action of the first runway.

20. The flight deck system of claim 19 wherein the controller is further configured to categorize the current braking action of the first runway and to visually code the braking action graphic in accordance with the categorization of the current braking action.

* * * * *